United States Patent [19]

Yamaguchi et al.

[11] Patent Number: 5,176,765
[45] Date of Patent: Jan. 5, 1993

[54] PNEUMATIC TIRE HAVING OUTER TREAD LAYER OF FOAM RUBBER

[75] Inventors: Kojiro Yamaguchi, Kodaira; Takashi Takusagawa, both of Oume, Japan

[73] Assignee: Bridgestone Corporation, Tokyo, Japan

[21] Appl. No.: 690,322

[22] Filed: Apr. 26, 1991

Related U.S. Application Data

[63] Continuation of Ser. No. 336,486, Apr. 12, 1989, abandoned.

[30] Foreign Application Priority Data

| Apr. 13, 1988 | [JP] | Japan | 63-92296 |
| May 19, 1988 | [JP] | Japan | 62-123686 |
| May 24, 1988 | [JP] | Japan | 63-127669 |
| Jun. 13, 1988 | [JP] | Japan | 63-146649 |

[51] Int. Cl.$^5$ .............................. B60C 11/00
[52] U.S. Cl. ........................ 152/209 R; 152/DIG. 3; 152/DIG. 4
[58] Field of Search ........ 152/209 R, 209 D, DIG. 3, 152/532, DIG. 4, 310, 313, 323

[56] References Cited

U.S. PATENT DOCUMENTS

| 1,470,048 | 10/1923 | Barker | 152/313 |
| 1,719,628 | 7/1929 | Sloman | 152/DIG. 4 |
| 2,302,027 | 11/1942 | Havens | 152/DIG. 3 |
| 3,348,597 | 10/1967 | Goldberg et al. | 152/323 |
| 4,006,766 | 2/1977 | Takayanagi et al. | 152/209 R |
| 4,249,588 | 2/1981 | Egan | 152/209 R |
| 4,690,189 | 9/1987 | Bradisse et al. | 152/209 R |

FOREIGN PATENT DOCUMENTS

| 625566 | 8/1961 | Canada | 152/DIG. 4 |
| 006711 | 12/1982 | European Pat. Off. . | |
| 1194721 | 6/1960 | Fed. Rep. of Germany . | |
| 3703480 | 8/1987 | Fed. Rep. of Germany | 152/209 R |
| 146405 | 11/1981 | Japan | 152/209 R |
| 124414 | 7/1984 | Japan | 152/209 R |
| 61-64503 | 4/1986 | Japan . | |
| 61-159203 | 10/1986 | Japan . | |
| 61-261109 | 11/1986 | Japan . | |
| 62-191202 | 8/1987 | Japan . | |
| 62-283001 | 12/1987 | Japan . | |
| 63-89547 | 4/1988 | Japan . | |
| 90402 | 4/1988 | Japan . | |
| 2044191 | 10/1980 | United Kingdom . | |

OTHER PUBLICATIONS

Patent Abstract of Japan, vol. No. 191 (M495)(2247) Jul. 4, 1986, & JP-A-61 36003 (Suzuki Motor Co. Ltd.) Feb. 20, 1986.

Primary Examiner—Geoffrey Knable
Attorney, Agent, or Firm—Sughrue, Mion, Zinn, Macpeak & Seas

[57] ABSTRACT

To prevent crack occurrence at groove bottoms on both side areas of foam rubber tread of all-season studless tires, the pneumatic tire having a tread surface portion composed of at least two outer and inner rubber layers is characterized in that the hardness of the inner rubber layer lies from 54 to 80 degrees in Shore hardness and is higher than that of the outer rubber layer, and further the outer rubber layer is made of foam rubber with a foam rate from 5 to 50% with at least 10% volume ratio with respect to tread volume. The outer foam rubber layer serves to improve tire performance on icy and snowy roads in winter, and the inner ordinary rubber layer serves to reduce change in groove width after vulcanization, that is, reduce dynamic strain concentration at lateral grooves and therefore to reduce crack generation at the lateral groove bottoms.

18 Claims, 7 Drawing Sheets

PNEUMATIC TIRE HAVING OUTER TREAD LAYER OF FOAM RUBBER

This is a continuation of application Ser. No. 07/336,486 filed Apr. 12, 1989 now abandoned.

BACKGROUND OF THE INVENTION

1. Field of the Invention

The present invention relates to a pneumatic tire, and more specifically to a pneumatic tire excellent in wear resistance in summer (including spring and autumn) without deteriorating steerability and heat durability and further in drivability, braking ability and steerability on icy and snowy roads in winter. In addition, the present invention relates in particular to a pneumatic tire which can improve riding comfortability and road noise and further anticrack resistance at tire groove bottoms. This application relates to a copending application which was filed on Jan. 30, 1987 and bears U.S. Ser. No. 009,367.

2. Description of the Prior Art

In general, studless tires and foam rubber tires having foam rubber on the tread are used to prevent dust pollution and road damage as all-season tires suitable for use in travelling both on icy and snowy roads in winter and on paved roads in summer.

Prior-art pneumatic tire using foam rubber on the tread, is a so-called block pattern such that the tread is formed with blocks partitioned by circumferential and lateral grooves or a so-called lug pattern such that the tread is formed with lateral grooves has been well known. These prior-art pneumatic tires are provided with certain tire performance on icy and snowy roads in winter season. However, there still exists a problem in that since circumferential driving forces, circumferential braking forces and lateral forces are repeatedly applied to both tread side areas during travelling, and therefore dynamic strains are repeatedly concentrated at groove bottoms of the foam rubber, cracks are produced at groove bottoms.

SUMMARY OF THE INVENTION

With these problems in mind, therefore, it is the primary object of the present invention to provide a pneumatic tire having a tread improved in various tire performance required for both winter and summer, by making the best use of foam rubber which can improve various performance on icy and snowy roads, while preventing crack generation at groove bottoms on both tread side areas.

To achieve the above-mentioned object, the pneumatic tire, according to the present invention, having a tread portion (3) composed of at least two rubber layers of a radially outward arranged outer rubber layer (3A) and a radially inward arranged inner rubber layer (3B) and tread side portions with side rubbers (3D) for covering both sides of the tread portion (3) and formed with a plurality of lateral grooves (10) extending in the tread crossing direction at least on both sides of the tread portion (3) and arranged at regular intervals in a circumferential direction of the tire, is characterized in that Shore A hardness of said inner rubber layer (3B) lies from 54 to 80 degrees and is higher than that of said outer rubber layer (3A); and said outer rubber layer is made of foam rubber whose foam rate lies from 5 to 50% and whose volume ratio with respect to a volume of said tread is at least 10%.

Further, it is preferable to effectively distribute the foam rubber in the outer rubber layer (3A) of the tread portion (3) in such a way that a foam rate $V_A$ of the foam rubber (17A) at both side areas (13A) of the outer rubber layer (3A) is smaller than that $V_B$ of the foam rubber (17B) at the central area (13B) partitioned by a boundary surface (22) parallel to an equatorial plane E from the side area (13A). The boundary surface can be inclined deep in cross section from near the tire shoulder portion (4) toward the center of the tread (3).

Further, it is preferable that thickness $D_{3A}$ of the outer rubber layer (3A) at the center E of a groove bottom (10C) of the lateral groove (10) lies from 70 to 10% of a thickness $D_3$ between a groove bottom surface (10d) and a belt layer (7).

Further, it is preferable that the thickness $D_L$ of the outer rubber layer (53A) at a land portion (51A) between the tire surface (51a) and a boundary line (L) lies from 15 to 85% of a depth $D_{52}$ of a main groove (52). Furthermore, the outer rubber layer (3A) is preferably covered by a cover layer (9) having a thickness of 0.3 to 0.4 mm and made of an ordinary rubber.

In the pneumatic tire according to the present invention, since the tread portion is composed of an outer foam rubber layer and an inner ordinary layer, the hardness of the inner rubber layer is higher than that of the outer rubber layer, so that it is possible to reduce a change in groove width after vulcanization. In addition, since the foam rate of the foam rubber at both side areas of the outer rubber layer is determined smaller than that of the foam rubber at the central area, it is possible to increase the rigidity of the tire shoulder portions or the lateral grooves, so that change in groove width after vulcanization can be reduced and further dynamic strain concentration during travel can be reduced.

In summary, the outer foam rubber layer is effective to improve tire performance on icy and snowy roads in winter, and the inner ordinary rubber layer is effective to reduce any change in groove width after vulcanization, that is, to prevent the radius of curvature of lateral groove bottoms from being reduced after vulcanization. Since the groove width in lateral grooves formed on both tire shoulder portions is not reduced, it is possible to reduce dynamic strain concentration in the lateral grooves and therefore to reduce crack generation at the lateral groove bottoms.

BRIEF DESCRIPTION OF THE DRAWINGS

The features and advantages of the pneumatic tire according to the present invention will be more clearly appreciated from the following description taken in conjunction with the accompanying drawings in which.

DETAILED DESCRIPTION OF PREFERRED EMBODIMENTS

Figure 1:
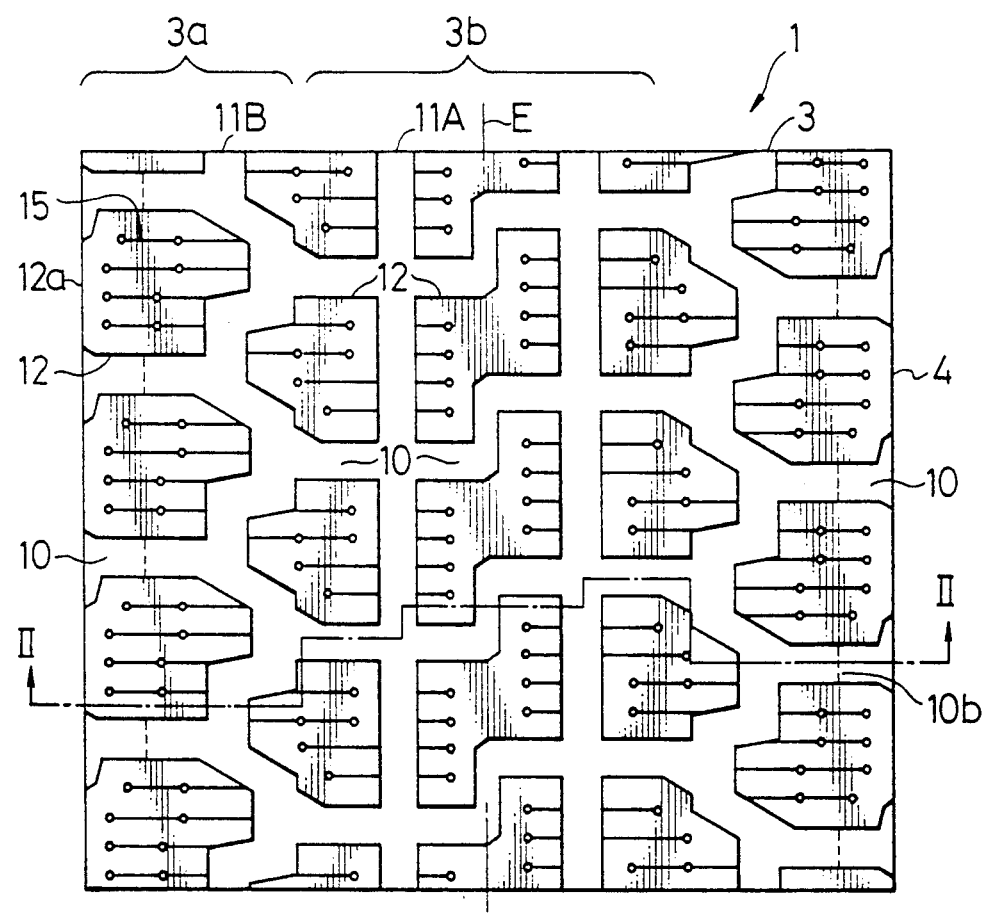
FIG. 1 is a plan view showing a tread pattern of a first embodiment of a pneumatic tire according to the present invention.

The inventors have studied pneumatic tires having a foam rubber tread from the standpoints of the dynamic status of grooves during both manufacturing and travelling, in particular the status of groove bottoms on both the tread side areas, and found the following results:

(1) In the tires having a foam rubber tread, the width of grooves is narrowed after having been vulcanized as compared with the tires having an ordinary rubber tread (no foaming agent is included in the rubber). This is because after the tire has been vulcanized and therefore vulcanizing pressure is reduced within a vulcanizing mold, the foam rubber expands to deform the tread in such a way that the groove width is narrowed. As a result, the radius of curvature at the groove bottom tends to be reduced.

(2) Since the rigidity of the foam rubber tread is relatively small, dynamic strains produced at the tread tend to increase during travelling under load, in particular on both tread side areas, that is, at lateral grooves formed near the tire shoulder portions.

(3) Since the strength of foam rubber is smaller than that of the ordinary rubber including no foaming agent, cracks are easily produced in foam rubber. The object of the present invention is to advantageously solve the above-mentioned problems.

The basic concept of the pneumatic tire according to the present invention provides a pneumatic tire having a tread portion composed of at least two rubber layers, a radially outward arranged outer rubber layer and a radially inward arranged inner rubber layer and tread side portions with side rubbers for covering both sides of the tread surface portion and formed with a plurality of lateral grooves extending in the tread crossing direction at least on both sides of the tread portion and arranged at regular intervals in the circumferential direction of the tire. The Shore A hardness of the inner rubber layer lies from 54 to 80 degrees and is at least higher than that of the outer rubber layer; and the outer rubber layer is made of foam rubber whose foam rate lies from 5 to 50% and whose volume ratio with respect to the volume of the tread is at least 10%.

The reason why the tread portion is composed of at least two outer and inner tread rubber layers is as follows: In general, although a foam rubber is used for the tread to improve various tire performance on icy and snowy roads in winter, after the vulcanizing pressure is removed, the foam rubber expands and therefore the lateral groove width is deformed smaller so that the radius of curvature at the lateral groove bottom is reduced. However, it is possible to reduce a change in groove width by forming the inner tread layer of rubber with specific physical properties. The rubber used for the inner tread layer is an ordinary rubber or a foam rubber with a foam rate smaller than that of the outer tread layer and a Shore A hardness (54 to 80 degrees) higher than that of the outer tread layer. Further, when the hardness is less than 54 degrees, the effect of reducing the groove width deformation is small. When the hardness is more than 80 degrees, the tire performance on icy and snowy roads is deteriorated.

Further, the outer foam rubber layer has a volume at least 10% or more of the total tread volume, more preferably 10 to 70% and the most preferably 40 to 60%. The reason why the outer tread layer volume is determined to be at least 10% or more of the entire tread volume is that if less than 10%, the tire performance on icy and snowy roads cannot be effectively improved.

Further, Shore A hardness of the outer rubber layer is preferably from 35 to 53 degrees. The foam rate V of foam rubber is calculated by the following formula:

$$V = (\rho_0/\rho_1 - 1) \times 100 \, (\%) \quad (1)$$

where $\rho_0$ is the density (g/cm$^3$) of solid portion of foam rubber; $\rho_1$ is the density of foam rubber. The foam rate V of the outer rubber layer is preferably from 5 to 50%, and more preferably 5 to 30%. The reason why the foam rate V is determined from 5 to 50% is that if less than 5%, it is impossible to obtain softness of foam rubber at low temperature. If more than 50%, it is impossible to obtain practically sufficient wear resistance on dry roads (other than icy and snowy roads and wet roads).

Further, the average independent bubble diameter of foam rubber is preferably 5 to 150 um, preferably 10 to 100 um. The reason why the average bubble diameter is determined to be 5 to 150 um is that if less than 5 um, the tire performance on icy and snowy roads is not improved and if more than 150 um, wear resistance is reduced markedly and further deformation restoration force of the foam rubber (e.g. antideformation) is reduced markedly, thus resulting in tire block deformation and sipe clogging during travelling due to tire permanent set in fatigue and therefore lower tire performance on icy and snowy roads. In addition, if more than 150 um, it is impossible to obtain a stable tire shape in the manufacturing process since the anticutting performance is lowered and the blocks are easily broken off.

Further, it is preferable that the foam rubber includes 20 or more 30 to 120 um diameter independent bubbles per unit area of 1 mm$^2$ at the central area of the outer rubber layer, and the number of bubbles is more preferably 30 or more.

Furthermore, the foam rubber used for the tread of the pneumatic tire according to the present invention is formed by adding a foaming agent to the ordinary rubber composition and by heating it under pressure in accordance with the ordinary tire manufacturing process. The foaming agent is dinitropentamethylene-tetraamine, benzenesulfonylehydrazide, high boiling-point hydrocarbon compound (resin microcapsule), etc.

Embodiments of the present invention will be explained hereinbelow with reference to the attached drawings. Tests of foam rubber properties and test tire performance have been made in accordance with the following methods:

Test methods (1) Average bubble diameter and foam rate V

To obtain an average bubble diameter, block-shaped test samples were cut away from the foam rubber layer of the tread of test tires; pictures of the sample cross sections were taken by an optical microscope of 100 to 400 magnifying power; and the diameter of 200 and more independent bubbles were measured and averaged as an arithmetical mean.

To obtain a foam rate V of foam rubber, the block-shaped test sample was sliced into thin pieces with thickness of 2 um; the sliced test pieces were aged for stabilization for one week after vulcanization to measure the density $\rho_1$ (g/cm$^3$). On the other hand, the density $\rho_0$ of the non-foam rubber tread (solid phase rubber) was measured; and the foam rate V was calculated in accordance with the formula (1).

(2) Independent bubble diameter and the number of bubbles

To obtain independent bubble diameters and the number of bubbles, block-shaped test samples were cut away from the foam rubber layer of the tread of test tires; pictures of the sample cross sections were taken by an optical microscope of 100 to 400 magnification power. Therefore, the number of 5 um or more diameter independent bubbles was measured over an area of 4 mm$^2$ or more to obtain the number of independent bubbles per unit area (1 mm$^2$).

(3) Dynamic elastic modulus of foam rubber

Rectangular samples (4.6 mm in width, 30 mm in length and 2 mm in thickness) were cut away from the foam rubber layer of the tread of test tires; and the elastic modulus was measured by a dynamic elastic modulus meter (Iwamoto Seisakusho) at temperature 30° C., at frequency 60 H$_z$ and at amplitude strain 1%.

(4) Steerability

The test tires were attached to the ordinary cornering performance test machine installed in a room and cornering powers were measured by applying a load of 395 kg to the test tires. The indices are indicated with the performance of the ordinary rubber tread tire as 100. The larger the indices are, the better will be the performance.

(5) Braking ability on ice

Four test tires were attached to a 1800 cc passenger car, and braking distances were measured on ice at ambient temperature −5° C. The indices are indicated with the performance of the ordinary rubber tread tire as 100. The larger the indices are, the better will be the braking performance.

(6) Climbing ability on snow

Four test tires were attached to a 1800 cc passenger car, and the climbing times necessary to travel a distance 50 m were measured at a slope with a gradient of 7% at ambient temperature −5° C. The indices are indicated with the performance of the ordinary rubber tread tire as 100. The larger the indices are, the better will be the climbing performance.

(7) Riding comfortability

The test tires were attached to a fixed shaft of an ordinary projection override vibration test machine installed in a room, and variation in shaft load were measured when the tires overrode the projections under load of 395 kg. The indices are indicated with the performance the ordinary rubber tread tire as 100. The larger the indices are, the better will be the riding comportability.

(8) Road noise performance

Four test tires were attached to a 1800 cc passenger car, and sound pressure was measured by a road noise meter when the car was travelling on a specified road noise test road.

(9) Wear resistance

Four test tires were attached to a 1800 cc passenger car, and changes in groove depth were measured after the car had travelled 10,000 km on public roads. The indices are indicated with the wear resistance of the ordinary rubber tread tire as 100. The larger the indices are, the better will be the wear resistance.

(10) Anticrack performance at sipes and groove bottoms

Four test tires were attached to a 1800 cc passenger car, and the occurrences of sipe bottom cracks and groove bottom cracks were observed after the car had travelled 20,000 km on public roads.

Embodiments of the present invention will be described with reference to the attached drawings.

Figure 2:
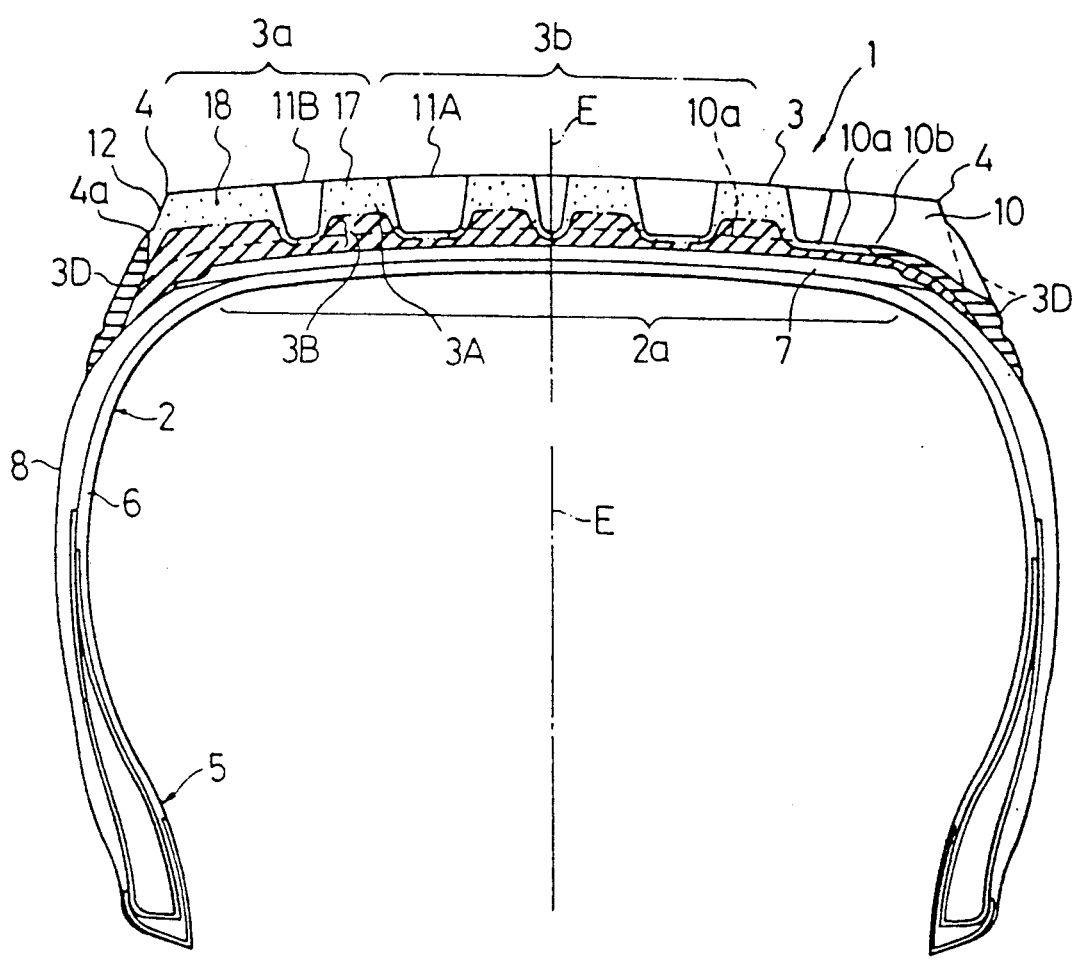
FIG. 2 is a cross-sectional view taken along the line II—II in FIG. 1.
Figure 3:
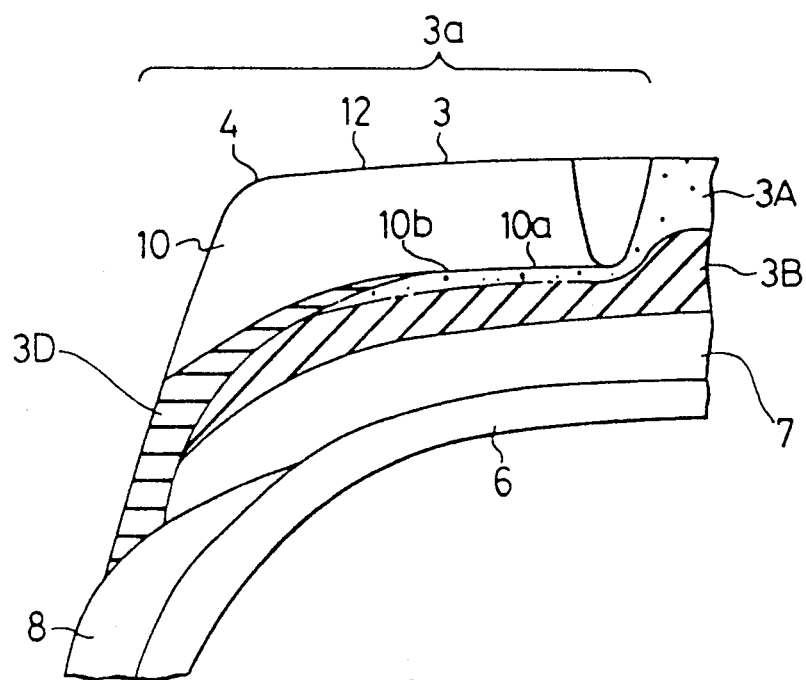
FIG. 3 is an enlarged cross-sectional view showing the essential portion of the pneumatic tire shown in FIG. 2.

FIGS. 1 to 3 show a first embodiment of the pneumatic tire according to the present invention.

In FIGS. 1 and 2, a pneumatic tire (tire size: 165 SR13) 1 includes a tire case 2, and a tread portion 3 covering a crown portion 2a of the case 2 between two shoulder portions 4. The case 2 comprises a pair of bead portions 5, a carcass 6 made of rubber coated cords arranged substantially in the tire radial direction between the two bead portions 5, and a belt layer 7 arranged substantially in the tire circumferential direction outside the crown portion 2a of the carcass 6.

Further, side walls 8 are formed on both the axially outsides of the carcass 6 of the case 2.

The tread portion 3 is composed of an outer rubber layer 3A arranged radially outward so as to be in contact with road surface and an inner rubber layer 3B arranged radially inward, and side rubber portions 3D for covering both the sides of the tread portion 3.

Figure 4:
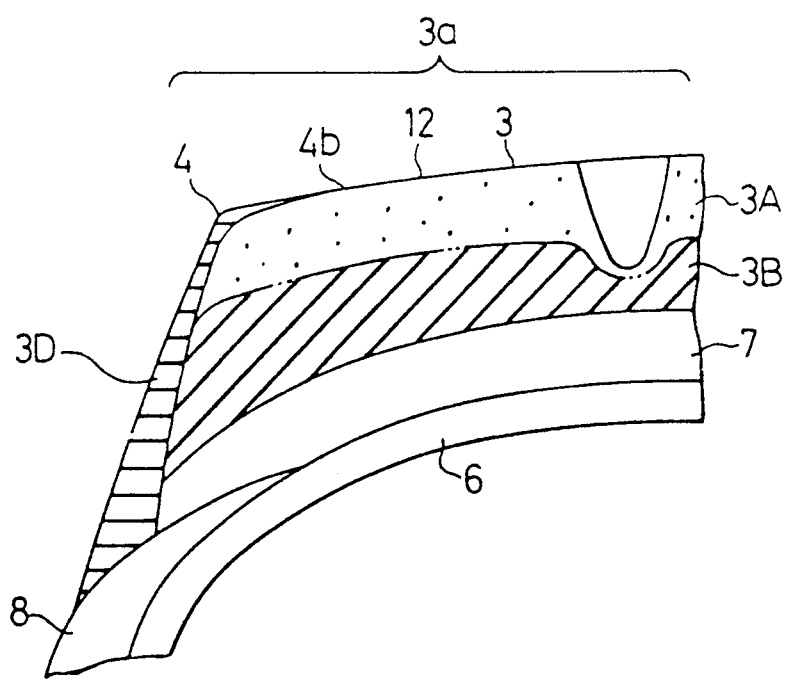
FIG. 4 is an enlarged cross-sectional view showing the essential portion of another modification of the pneumatic tire shown in FIG. 3.

In this first embodiment, the side rubber portion 3D is the ordinary rubber including no foaming agent and, as shown in FIGS. 2 and 3, covers the tread portion 3 to a position 4a on the side wall 8 or a position 10b of a bottom of lateral groove 10. Further, it is also possible to design the side rubber portion 3D to cover the shoulder portion 4 to an axially outside part 4b of the tread portion 3 as shown in FIG. 4. The above tread portion 3 can be manufactured by simultaneously extruding three rubbers of outer rubber layer; the inner rubber layer 3B and two relatively thin side rubber portions 3D from an extrusion machine into a trapezoidal (in cross section) shape in multilayer state or by separately extruding three rubber layers into three pieces of sheet, separately before bonding these rubbers. The volume $V_{3A}$ of the outer rubber layer 3A is 60% of the total volume V of the tread 3. The tread 3 is formed with a plurality of lateral grooves 10 extending in the lateral direction of the tread 3 and arranged with approximately regular intervals in the tire circumferential direction at both side areas 3a and the central area 3b.

Further, the tread portion 3 is formed with two straight circumferential grooves 11A at the central area 3b and two zigzag circumferential grooves 11B at both the side areas 3a so as to form block-shaped land portions 12. Sipes 15 are formed in the tire lateral direction on the land portion 12.

In this embodiment, the outer rubber layer 3A of the tread portion 3 is made of a foam rubber 17 having a foam rate V=22% and composition 1 as shown Table 1.

The foam rubber 17 is $5.0 \times 10^7$ dyn/cm$^2$ in dynamic elastic modulus and Hd=46 in Shore A hardness. Further, the inner rubber layer 3B is made of an ordinary rubber having composition 2 as shown in Table 1. The ordinary rubber is $10 \times 10^7$ dyn/cm$^2$ in dynamic elastic modulus and Hd=60 in Shore A hardness (both higher than those of the outer rubber). The side walls 8 are an ordinary side wall rubber excellent in antibending performance. Further, the side rubber portions 3D are the ordinary rubber whose form rate V is smaller than that of the outer rubber layer (i.e. excellent in antibendability and anticutting performance). In this embodiment, in practice, the side rubber portions 3D are made of the ordinary rubber of zero foam rate.

The foam rubber 17 of the rubber composition 1 as shown in Table 1 includes rubber components composed of polymer whose glass transition temperature is −60° C. or lower (e.g. natural rubber whose glass transition temperature is −72° C.), stylene butadiene rubber whose glass transition temperature is −73° C., and polybutadiene rubber whose glass transition temperature is −100° C. and mixed with the ordinary compounding agent and foaming agent (dinitropentamethylenetetoramine and urea).

The tires are formed, heated, pressurized, vulcanized and depressurized within a vulcanizing mold in accordance with the ordinary tire manufacturing method. The foam rubber includes independent bubbles (shown by black points in the drawing) 18 when expanded.

TABLE 1

| Rubber Material | Composition 1 Outer rubber layer (Foam rubber) | Composition 2 Inner rubber layer (Ordinary rubber) | Composition 3 Ice compound |
|---|---|---|---|
| Natural rubber | 45 | 40 | 45 |
| Styrene butadiene rubber | 20 | 30 | 20 |
| Polybutadiene rubber | 35 | 20 | 35 |
| Carbon black | 75 | 80 | 75 |
| Process oil | 15 | 30 | 15 |
| Low temp. Softener (Part) | 0 | 0 | 30 |
| Stearic acid | 3.0 | 3.0 | 3.0 |
| Wax | 1.0 | 1.0 | 1.0 |
| Age resistor | 1.5 | 1.5 | 1.5 |
| Zinc white | 3.5 | 3.5 | 3.5 |
| Vulcanizing accelerator | 1.5 | 1.5 | 1.5 |
| Sulfur | 1.8 | 1.8 | 1.8 |
| Foaming agent: DPT*1 | 2.5 | — | — |
| Assistant:Urea | 2.5 | — | — |
| Foam rate V (%) | 22 | — | — |
| Average bubble dia. (um) | 32 | — | — |
| Number of bubbles (pie./mm$^2$) | 84 | — | — |
| Dynamic elastic modulus E' ($\times 10$ dyn/cm$^2$)*2 | 5.0 | 10 | 5.2 |
| Hardness Hd (°) | 46 | 60 | 53 |

*1: Dinitropentamethylenetetoramine
*2: Physical property of rubber itself after vulcanication The foam rubber 17 (Composition 1) used for the embodiment is 22% in foam rate V, and has independent bubbles whose average diameter is 32 um and 84 independent bubbles whose diameters lie from 30 to 200 um per unit area 1 mm$^2$. The construction and the manufacturing method of those other than the tread 3 are the same as in the ordinary pneumatic tires, therefore the description thereof being omitted herein.

In the manufacturing process, as already described, three rubbers of outer rubber layer 3A, the inner rubber layer 3B and two relatively thin side rubber portions 3D are extruded into a trapezoidal shape in multilayer state as green tread. During the vulcanization process, since the side rubber portions 3D for covering both the sides of the multilayer tread are pushed by projections which form lateral grooves of a vulcanizing mold, the side rubber portions 3D are arranged to cover the groove bottoms 10a of the lateral groove 10 to a position 10b as shown in FIG. 3. Under these rubber formation, since the foam rate V decreases (e.g. down to 5% in this embodiment) at both the side areas of the outer rubber layer 3A (shown in FIGS. 2 to 4), in particular at the wedge-shaped portions extending from the side rubber portions 3D, it is possible to prevent strains from being concentrated at the groove bottoms 10a and therefore cracks from being produced.

Figure 5:
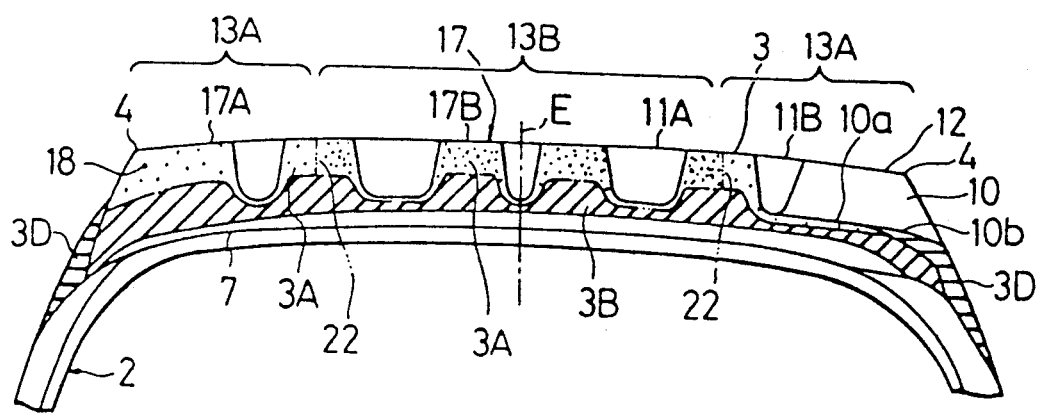
FIG. 5 is a cross-sectional view of a second embodiment of the pneumatic tire according to the present invention.

FIG. 5 illustrates a second embodiment of the present invention. In this embodiment, foam rubber is effectively distributed on the outer rubber layer 3A of the tread portion 3 in such a way that the foam rate $V_A$ (15%) of the foam rubber 17A at both side areas 13A (each of which corresponds to 5 to 25% of the tread width) of the outer rubber layer 3A is smaller than that $V_B$ (22%) of the foam rubber 17B at the central area 13B partitioned by a boundary 22 parallel to an equatorial plane E from the side area 13A. The side rubber portions 3D are the ordinary rubber which covers both sides of the tread portion 3. The portions other than the above are the same as in the first embodiment.

The rubber composition of the foam rubber 17A is the same as composition 1 shown in Table 1 except the foaming agent (DPT) of 2.0 and assistant (urea) of 2.0. The physical properties of this foam rubber is 15% in foam rate V, 30 um in average bubble diameter, 62 pieces in the number of independent bubbles, $5.4 \times 10$ dyn/cm$^2$ in dynamic elastic modulus, and 47 degrees in hardness. The composition of the foam rubber 17B is the same as the composition 1.

In the second embodiment shown in FIG. 5, since both the sides of the tread are covered by the side rubber portions 3D and further the foam rate $V_A$ of the outer rubber layer 3A on both the side areas 13A is smaller (higher in rigidity) than that $V_B$ at the central area 13B, it is possible to increase the rigidity of the land portions 12 and to further increase the rigidity of the shoulder portions 4. In addition, it is possible to reduce a change in lateral groove width due to expansive deformation after vulcanization. Therefore, the movement of the land portion 12 is small even if a large traction force is applied to the tire during travelling under load. Further, it is possible to markedly reduce the strains generated at groove bottoms 10a of the lateral grooves 10 and the main circumferential grooves 11A and 11B, that is, to prevent the strains from being concentrated. Therefore, it is possible to prevent the occurrence of cracks at the groove bottoms 10a of the lateral grooves 10 and the main groove 11.

Further, the second embodiment has been explained of the case where the boundary 22 is parallel to the equatorial plane E. However, the present embodiment can be applied to the case where the boundary 22 is inclined in cross section toward the right or the left with respect to the equatorial plane E.

Figure 6:
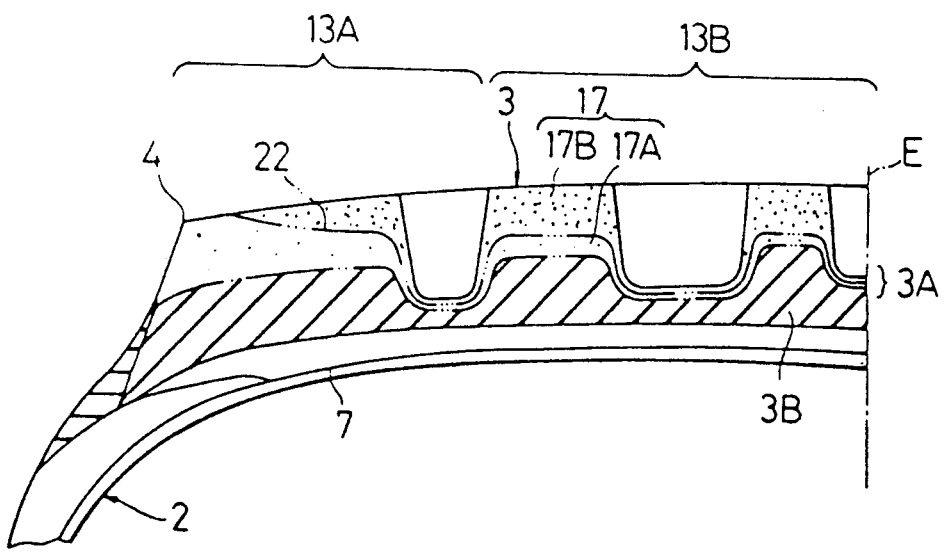
FIG. 6 is an enlarged cross-sectional view of a third embodiment of the pneumatic tire according to the present invention.

FIG. 6 shows a third embodiment of the present invention.

In this third embodiment, being different from the second embodiment shown in FIG. 5, the boundary surface 22 of the second embodiment is inclined deep or radially inwardly cross section from near the shoulder portion 4 to the center of the tread 3.

In the above-mentioned second and third embodiments of the present invention, the thickness of the outer rubber layer is approximately the same in cross section at both the side areas and the central area. However, in the present invention, it is also possible to gradually decrease the thickness of the outer foam rubber layer from the central area to both the side areas or near the shoulder portion and instead to gradually increase the thickness of the inner ordinary rubber layer (including no foam rubber) in the same direction.

Figure 7:
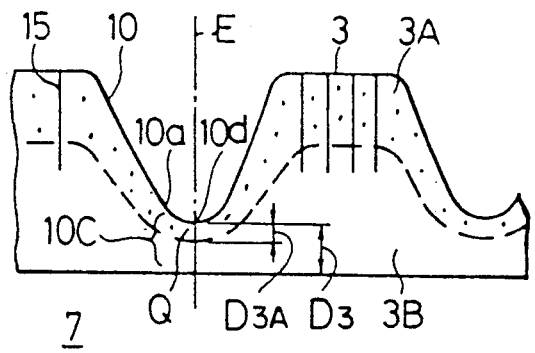
FIG. 7 is an enlarged cross-sectional view of a fourth embodiment of the pneumatic tire according to the present invention.
Figure 8:
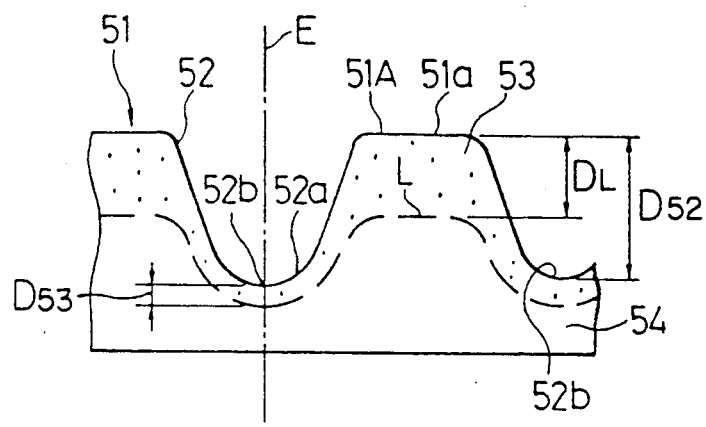
FIG. 8 is an enlarged cross-sectional view for assistance in explaining the limitation of the outer rubber layer range of the fourth embodiment shown in FIG. 7.

FIG. 7 shows a fourth embodiment, in which the thickness $D_{3A}$ of the outer rubber layer 3A at the center E of the groove bottom 10c of the lateral groove 10 is determined 70 to 10% of a thickness $D_3$ between the lateral groove bottom surface 10d and the belt layer 7, and more preferably 50 to 30% thereof. The reason why the thickness of the outer rubber layer is defined at the groove bottom will be described hereinbelow with reference to basic conceptual views shown in FIGS. 8 and 9.

Figure 9:
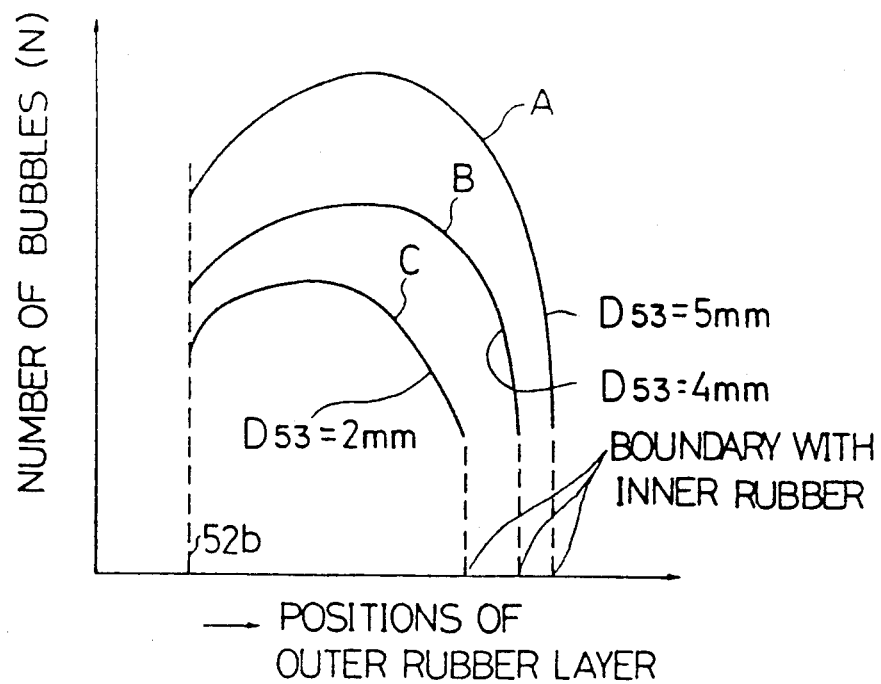
FIG. 9 is a graphical representation showing the relationship between the number of bubbles and the tire thickness.

In a groove 52 which partitions a land portion 51A of the tread portion 51, the number N of bubbles per unit tire cross-sectional area at the groove bottom 52a of the outer foam rubber layer 53 changes, as shown in FIG. 9, along the groove central line from the groove bottom surface 52b in the thickness direction of the outer rubber layer 53. In more detail, the number N of bubbles in the outer rubber layer 53 decreases near the groove bottom surface 52b and near the boundary between the outer and inner rubber layers 53 and 54 but increases at the middle portion of the outer rubber layer 53. Further, FIG. 9 indicates that the number N of bubbles in the outer rubber layer 53 decreases, as the thickness $D_{53}$ of the outer rubber layer 53 along the groove central line decreases from a curved line A ($D_{53}=5$ mm), B ($D_{53}=4$ mm), to C ($D_{53}=2$ mm). In this case, the number of bubbles in the outer rubber layer 53 at the land portion is substantially constant in the thickness direction of the outer rubber layer 53. As described above, when the thickness $D_{53}$ of the outer rubber layer 53 is reduced at the groove bottom into a predetermine range, it is possible to reduce the number of bubbles in the outer rubber layer and therefore to increase the strength of the groove bottoms.

In the fourth embodiment shown in FIG. 7, when the foam rate V of the outer rubber layer at the land portion was 22% and the thickness ratio $D_{3A}/D_3$ of the outer and total thickness at the groove bottom portion was 36% (0.8 mm), the foam rate V of the outer rubber layer at the middle portion thereof along the central line E of the groove bottom portion was 15%. Further, when the thickness ratio $D_{3A}/D_3$ lies in a range from 70 to 10%, the thickness $D_L$ of the outer rubber layer 53 at the land portion 51A (a distance between the surface 51a and the boundary line L) is 15 to 85% of the depth $D_{52}$ of the groove, and more preferably 30 to 70% thereof.

Figure 10:
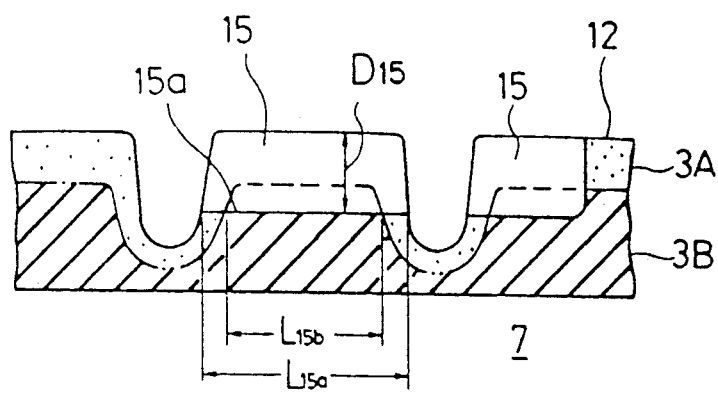
FIG. 10 is an enlarged cross-sectional view showing a fifth embodiment of the pneumatic tire according to the present invention.

FIG. 10 shows a fifth embodiment, in which sipes (or incisions) 15 (also shown in FIG. 1) formed in the tread extend beyond the major part of the outer rubber layer 3A in the groove depth direction and further into the inner rubber layer 3B. In FIG. 10, the depth $D_{15}$ of the sipes 15 is uniform over the entire length $L_{15a}$, and extends into the inner rubber layer 3B at a partial length $L_{15b}$ of the land portion 12 at the middle thereof.

Figure 11:
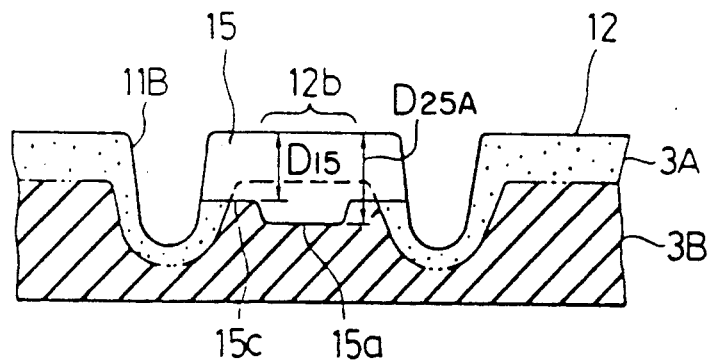
FIG. 11 is an enlarged cross-sectional view showing a sixth embodiment of the pneumatic tire according to the present invention.

FIG. 11 shows a sixth embodiment, in which the depth $D_{25A}$ of the sipe 15 at the middle portion 15a of the land portion is deeper than that $D_{15}$ of the sipe 15 on both sides 15c of the land portion 12. The width of the sipe is up to 3 mm, and preferably 0.3 to 1.5 mm.

Further, it is possible to consider various forms of sipes such as sipes each of whose both ends are open to the grooves as shown in FIGS. 10 and 11; sipes each of whose one end is open to the groove and each of whose other end is closed as shown in FIG. 1; sipes each of whose both ends are closed; straight sipes, jigzag sipes, wave-shaped sipes, etc. In this connection, a number of small circles described at one end and the middle portion of each of sipes (shown in FIG. 1) are holes connected to sipes and extending in the same depth direction as the sipes.

Figure 12:
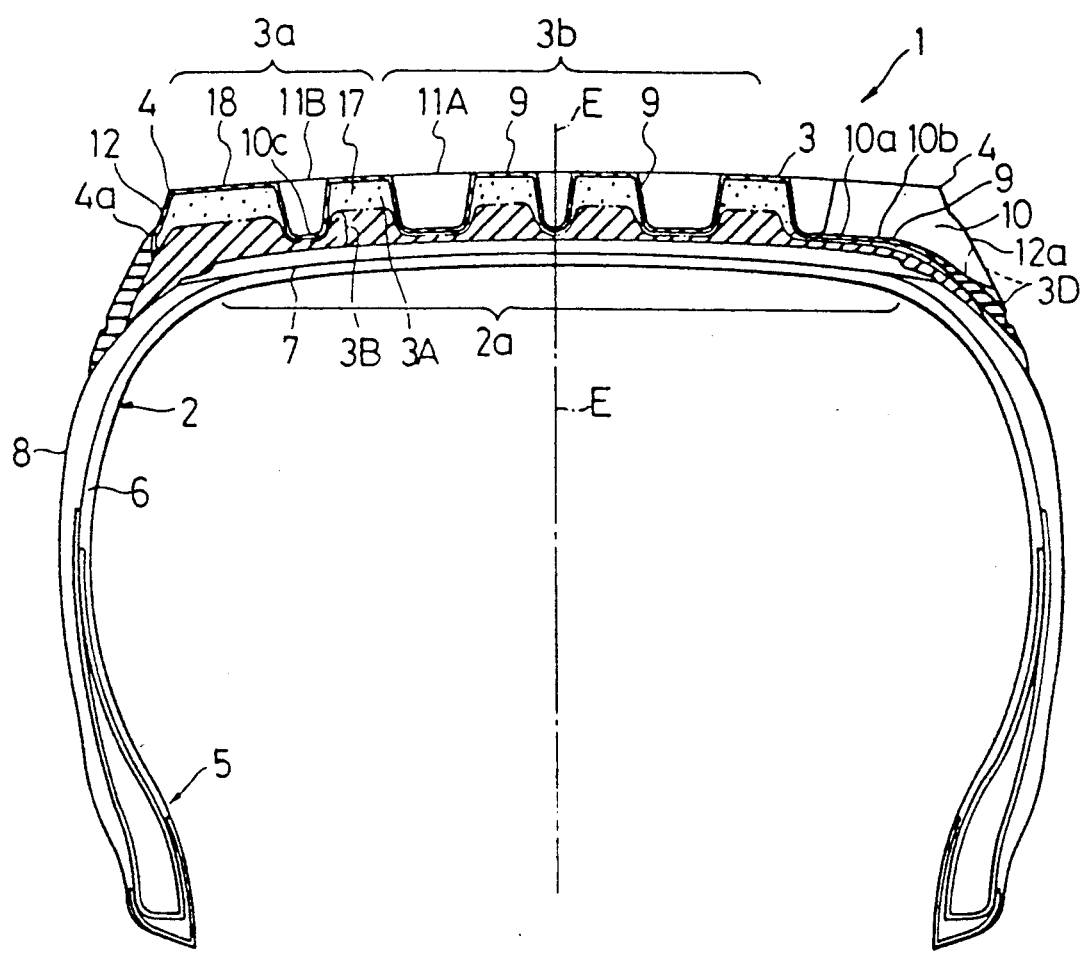
FIG. 12 is a cross-sectional view showing a seventh embodiment of the pneumatic tire according to the present invention.

FIG. 12 shows a seventh embodiment, in which the outer rubber layer 3A is entirely covered by a cover layer 9. This cover layer 9 is a thin ordinary rubber layer (not a form rubber layer) with a thickness of 1 mm or less, more preferably 0.3 to 0.5 mm. When the outer foam rubber layer 3A is covered by the cover layer 9, it is possible to effectively reinforce the lateral groove bottoms 10b and 10c and therefore prevent crack generation thereat. Further, it is also possible to cover only the groove bottoms of specific grooves, so far as circumstances permit, by the covering layer 9.

The effects of the present invention have been verified by use of test tires of three kinds as follows:

The test tires of ordinary structure (165SR 13 size) were used for comparison tests as shown in Table 2. The invention tires were formed with a tread as shown in FIGS. 1 and 2, and the comparison tires 1 and 2 were formed with a tread as shown in FIG. 1 (the groove dimensions were the same as in the invention tires). On the other hand, the tread rubber material of the invention tires was compositions 1 and 2 shown in Table 1; that of the comparison tires was composition 3 (ice compound) shown in Table 1; and that of the comparison tires was composition 1 (foam rubber) shown in Table 1 in only the tread surface portion.

The comparison tires 1 and 2 were basically the same as the invention tire except the above.

Tests have been effected in accordance with the above-mentioned test methods with respect to steerability, braking ability on ice, climbing ability on snow, riding comfortability, road noise performance, wear resistance and anticrack performance at groove bottoms.

TABLE 2

|  | Comparison 1 | Comparison 2 | Invention |
|---|---|---|---|
| Rubber kinds | Ice compound | Foam rubber | Foam rubber and ordinary rubber |
| Tread structure | Single rubber layer | Single rubber layer | Double rubber layers |
| Steerability | 100 | 85 | 97 |

TABLE 2-continued

|  | Comparison 1 | Comparison 2 | Invention |
|---|---|---|---|
| Braking ability on ice | 100 | 110 | 110 |
| Climbing ability on snow | 100 | 108 | 110 |
| Riding Comfortability | 100 | 110 | 107 |
| Road noise |  | 1 dB(A) less than Comparison 1 | 1 dB(A) less than Comparison 1 |
| Antiabrasion | 100 | 85 | 100 |
| Anticrack at groove bottoms | No crack | Many cracks | No crack |

The test results are shown with the indices of the comparison 1 as 100 in Table 2. The tires of the present invention are reduced in crack occurrence at groove bottoms as compared with the comparison tires 1 to 2, thus improving the tire performance markedly. That is, it is possible to markedly improve the various tire performance during travelling in winter, while maintaining various tire performance during travelling in summer.

As described above, according to the present invention, it is possible to prevent crack occurrence at groove bottoms on both the side areas of the tread, that is, to markedly improve the tire durability by making the best use of foam rubber which can improve the tire performance on icy and snowy roads in particular, while improving and maintaining various tire performance in both winter and summer.

What is claimed is:

1. A pneumatic tire having a tread portion formed with a plurality of circumferential grooves, a plurality of lateral grooves extending in the tread crossing direction at least between one of the circumferential grooves and each axial end of the tread and arranged at substantially regular intervals in a circumferential direction of the tire, land portions partitioned by the circumferential and lateral grooves, and said tread portion composed of at least two rubber layers with a radially outward arranged outer rubber layer and a radially inward arranged inner rubber layer, relatively thin side rubbers having anti-bending and anti-cutting performance for covering both axial ends of the tread portion composed of said outer and inner rubbers layers, said land portions in the tread portions having sipes, wherein the Shore A hardness of said inner rubber layer is in the range from 54 to 80 degrees and is higher than that of said outer rubber layer; said outer rubber layer is made of foam rubber whose foam rate lies from 5 to 50% and whose volume ratio with respect to a volume of said tread is at least 10%; each of said thin side rubbers made of rubber including no foaming agent and extends from the axial end of the tread into said lateral grooves to cover lateral groove bottoms formed on said outer rubber layer; the portions of said outer rubber layer covered by said side rubbers at said groove bottoms of lateral grooves formed into a wedge-shaped and said wedge-shaped portions of the outer rubber layer have a decreased foam rate; and said sipes formed in the land portions of the tread extend in groove depth direction into said relatively hard inner rubber layer through said foam outer rubber layer.

2. The pneumatic tire of claim 1, wherein the volume ratio of said outer rubber layer with respect to a volume of said tread lies preferably from 40 to 60 %.

3. The pneumatic tire of claim 1, wherein the Shore A hardness of said outer rubber layer lies preferably from 35 to 53 degrees.

4. The pneumatic tire of claim 1, wherein the foam rate of said outer rubber layer lies preferably from 5 to 30%.

5. The pneumatic tire of claim 1, wherein an average bubble diameter of the outer foam rubber layer lies from 5 to 150 um.

6. The pneumatic tire of claim 5, wherein the average bubble diameter of the outer foam rubber layer lies preferably from 10 to 100 um.

7. The pneumatic tire of claim 1, wherein the number of 30 to 120 um diameter bubbles per unit area of 1 mm$^2$ in the outer foam rubber layer is 20 or more at a central portion of tire land portions (12).

8. The pneumatic tire of claim 7, wherein the number of 30 to 120 um diameter bubbles per unit area of 1 mm$^2$ in the outer foam rubber layer is preferably 30 or more.

9. The pneumatic tire of claim 1, wherein the foam rubber is distributed in the outer rubber layer (3A) of the tread portion (3) in such a way that a foam rate $V_A$ of the foam rubber (17A) at both side areas (13A) of the outer rubber layer (3A) is smaller than a foam rate $V_B$ of the foam rubber (17B) at the central area (13B) partitioned by a boundary surface (22) parallel to an equatorial plane E from the side area (13A) to increase rigidity of tire shoulder portions.

10. The pneumatic tire of claim 1, wherein the foam rubber is distributed in the outer rubber layer (3A) of the tread portion (3) in such a way that a foam rate $V_A$ of the foam rubber (17A) at both side areas (13A) of the outer rubber layer (3A) is smaller than a foam rate $V_B$ of the foam rubber (17B) at the central area (13B) partitioned from the side areas (13A) by a boundary surface (22) inclined radially inwardly in cross section from near the tire shoulder portion (4) toward a center of the tread (3).

11. The pneumatic tire of claim 1, wherein a thickness $D_{3A}$ of the outer rubber layer (3A) at a center E of a groove bottom (10C) of the lateral groove (10) lies from 70 to 10% of a thickness $D_3$ between a groove bottom surface (10d) and a belt layer (7).

12. The pneumatic tire of claim 11, wherein the thickness $D_{3A}$ lies preferably from 50 to 30% of the thickness $D_3$.

13. The pneumatic tire of claim 11, wherein a thickness $D_L$ of the outer rubber layer (53) at a land portion (51A) between the tire surface (51a) and a boundary line (L) lies from 15 to 85% of a depth $D_{52}$ of a main groove (52).

14. The pneumatic tire of claim 13, wherein a thickness $D_L$ of the outer rubber layer (53) lies preferably from 30 to 70% of the depth $D_{52}$ of a main groove (52).

15. The pneumatic tire of claim 1, wherein a depth $D_{15}$ of the sipe (15) is uniform over an entire length $L_{15a}$ and extends into the inner rubber layer (3B) at a partial length $L_{15b}$ of a land portion of said sipe at the middle thereof.

16. The pneumatic tire of claim 1, wherein a depth $D_{25A}$ of the sipe (15) at a middle portion (15a) of the land portion is deeper than that $D_{15}$ of the sipes (15) on both sides (15c) of the land portion.

17. The pneumatic tire of claim 1, wherein the outer rubber layer (3A) is covered by a cover layer (9) having a thickness of 0.3 to 0.4 mm and made of rubber.

18. The pneumatic tire of claim 17, wherein only groove bottoms (10a, 10b, 10c) of the outer rubber layer (3A) is covered by the cover layer (9).

* * * * *